Jan. 29, 1924.
H. BACHARACH
MAGNIFYING MANOMETER
Filed March 6, 1922
1,481,952
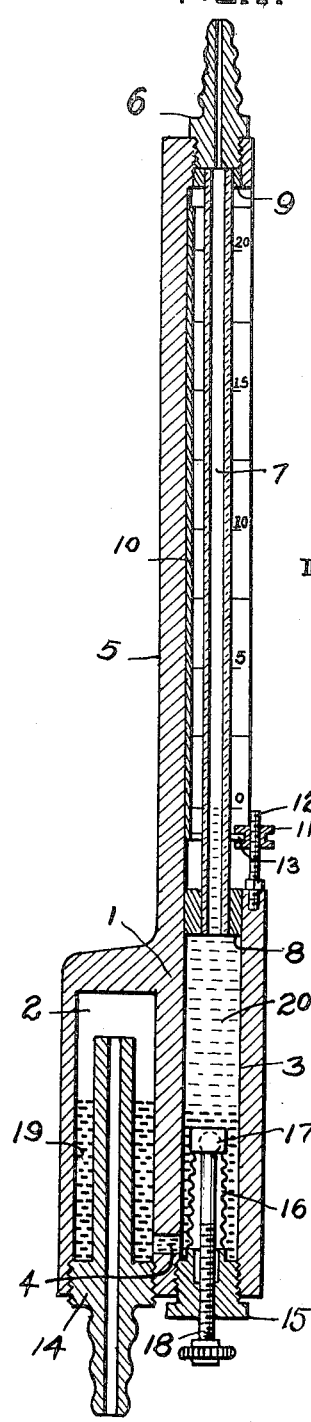
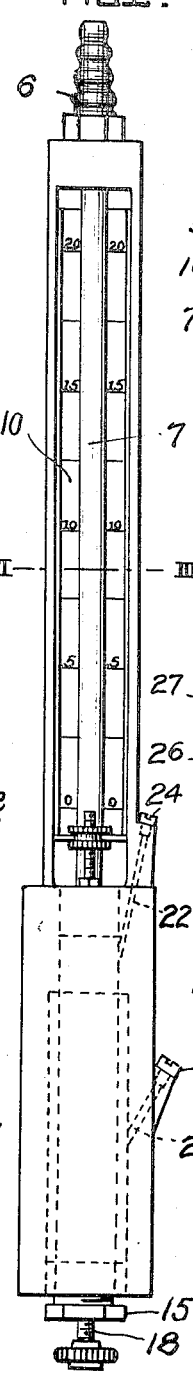
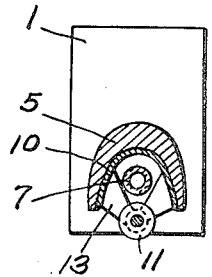
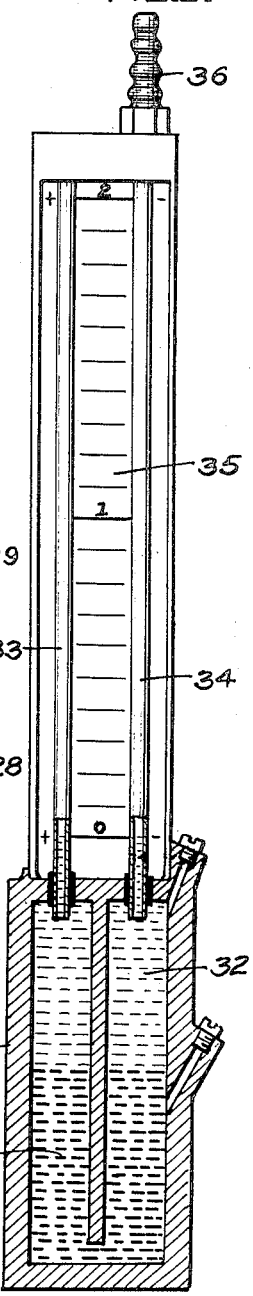
INVENTOR
Herman Bacharach
by
Homer C. Bradley
Atty.

Patented Jan. 29, 1924.

1,481,952

UNITED STATES PATENT OFFICE.

HERMAN BACHARACH, OF PITTSBURGH, PENNSYLVANIA, ASSIGNOR TO BACHARACH INDUSTRIAL INSTRUMENT-COMPANY, A CORPORATION OF PENNSYLVANIA.

MAGNIFYING MANOMETER.

Application filed March 6, 1922. Serial No. 541,364.

*To all whom it may concern:*

Be it known that I, HERMAN BACHARACH, a citizen of the United States, and a resident of Pittsburgh, in the county of Allegheny and State of Pennsylvania, have made a new and useful Invention in Magnifying Manometers, of which the following is a specification.

The invention relates to manometers. It has for its primary object the provision of an improved construction in which any desired range of the indicating liquid in the gage glass may be secured. A further object is the provision of improved means for securing an adjustment of the level of the liquid in the gage to compensate for losses or variations in volume due to temperature changes.

Where it is desired to measure relatively low differences in pressure, the ordinary mercury gage gives such a short range of movement that accuracy in reading the gage is lacking. On the other hand, if a light liquid is used with such pressures such as water or oil, the range of movement is so great as to require an instrument of such size as to be unwieldy and impractical. The present invention is designed to overcome these difficulties in handling low pressures, by the use of an expedient whereby a heavy liquid, such as mercury, may be used, and a magnification in the indicating tube secured of exactly the extent necessary to give the desired accuracy in reading. Briefly stated, this is accomplished by using a lighter liquid than mercury in the indicating leg of the gage on top of the mercury, and making the cross sectional area of the leg carrying the lighter liquid less than that of the other leg of the gage, so that for each unit of variation in level in the chamber of larger diameter there will be a movement of several units in the level of the indicating leg of the gage. Certain embodiments of the invention are illustrated in the accompanying drawings wherein:

Figure 1 is a vertical section through one form of gage involving my invention and Fig. 2 is a front elevation thereof. Fig. 3 is a transverse section through the line III—III of Fig. 2. Fig. 4 is a partial vertical section through the lower end of a gage designed for measuring flow. And Fig. 5 is a partial front elevation and partial section through a modified form of gage for measuring either pressure or suction.

Referring to the construction of Figs. 1, 2 and 3, 1 is the base of the metal casting constituting the body portion of the device, which device has a pair of cavities 2 and 3 connected at their lower ends by the passage or part 4. Extending upward from the base 1 is the standard 5 of the cross section indicated in Fig. 3 and provided at its upper end with the plug 6. Mounted in the curved recess in the standard 5 (Fig. 3) is the gage glass 7, the lower end of the glass communicating with the chamber 3 and being packed by means of the gasket 8 of rubber or other suitable material. The upper end of the tube is similarly packed by means of the gasket 9. Behind the glass 7 is the scale 10, such scale being guided and held in the curve of the standard 5 and being adjustable vertically by means of the nut 11 threaded on the stud 12, the nut being grooved as shown and engaging the flanges 13 formed on the lower end of the scale 10.

The leg or chamber 2 is provided with the plug 14 through which the plus or positive pressure is applied. The lower end of the chamber 3 is provided with the screw plug 15 provided at its inner end with the corrugated metal shell 16. The inner end of the shell is closed by the plug 17 in which is swivelled the inner end of the expanding screw 18 which is threaded through the plug 15. The shell 16 may be expanded and contracted by means of the screw 18 thus changing the space occupied by the shell, and in this way the level of the liquid in the chambers may be adjusted to compensate for leakage or changes in volume of the liquid due to other causes. The use of this device obviates the requirement for a stuffing box such as is required where a volume adjusting plug of the ordinary type is used which screws into and out of the mercury chamber. Two liquids are employed in the legs or chambers 2 and 3, a heavy one 19 such as mercury which lies in the bottom of both chambers, and a lighter one 20, such as oil which is imposed upon the mercury in the chamber 3. The passage in the gage glass 7 constitutes a continuation of the chamber 3 and has a cross section which is only a fraction of that of the chambers 2 and 3. For the sake of illustration the cross section of the gage glass passage may be made only one-fourth that of the chamber 2, and as a result a downward movement of the liquid in the chamber 2 of one-fourth of an inch will cause an upward movement of the level of the glass of about one inch. By changing the relative cross section of the chamber 2 and passage in any desired magnification in the range of movement may be secured.

In order to supply conveniently the two liquids to the chambers 2 and 3, the inclined passages 21 and 22 are provided, such passages being provided with suitable closure screws 23 and 24 (Fig. 2). This permits the convenient filling or replenishing of the apparatus when necessary, without disturbing the connections to the plugs 6 and 14.

Fig. 4 illustrates a modification for use in the measuring of the flow of fluids. The construction is in general similar to that of Fig. 1, except that the plug 25 is tapered so that the cross sectional area of the mercury 26 in the chamber 27 decreases as the level is lowered. The tapering is so adjusted that equal division lines on the scale represent equal volumes (or velocity) of fluid flow. The light liquid 28 is imposed on the heavy liquid in the low pressure leg of the device, as in the first construction, and the gage glass constitutes a continuation of such low pressure leg, but of reduced cross section so as to give the desired magnification.

Fig. 5 illustrates still another modification of the gage adapted to measure both pressure and suction. The device comprises the base casting 30 provided with the two chambers carrying the heavy and light liquids 31 and 32, and the two gage glasses 33 and 34, with the scale 35 between them. The upper end of the glass 33 is open to the atmosphere while the other glass 34 has its upper end in communication with the supply plug 36. When pressure is applied through the plug 36, a reading is secured from the tube 33 and when suction is applied through such plug, a reading is secured from the tube 34.

What I claim is:

1. In combination in a gage, a pair of vertical pressure legs, a gage glass leading upward from the end of one of such legs and having an outlet at its upper end, a screw plug constituting the bottom closure of the leg having the gage glass, an indicating liquid in the legs, means for adjusting the level of the liquid in the legs carried by said plug, a second screw plug constituting the bottom closure of the other leg, and an inlet tube carried by said second screw plug and extending upward through the pressure leg to a point above the level of the indicating fluid therein.

2. In combination in a gage having a transparent indicating tube, a scale along the tube, a chamber for an indicating liquid, and a liquid in said chamber, of a means for adjusting the level of the liquid in the indicating tube comprising a cylinder within an accordion wall lying in the liquid in the chamber, and means operable from the exterior of the chamber for lengthening and shortening said cylinder.

3. In combination in a gage having a transparent indicating tube, a scale along the tube, a chamber for an indicating liquid, and a liquid in said chamber, of a means for adjusting the level of the liquid in the indicating tube comprising a plug screw threaded into the wall of the chamber, a cylindrical accordion shell carried by the inner end of the plug and lying in the chamber with its inner end closed, and a screw threaded through the plug and connected to the inner end of the shell for lengthening and shortening said shell.

4. In combination in a gage having a transparent indicating tube, a scale along the tube, a chamber for an indicating liquid, and a liquid in said chamber, of a means for adjusting the level of the liquid in the indicating tube comprising a plug screw threaded into the wall of the chamber, a cylindrical accordion shell carried by the inner end of the plug and lying in the chamber with its inner end closed and a screw threaded through the plug having its inner end swivelled to the inner end of the shell for lengthening and shortening said shell.

5. In combination in a gage, a pair of pressure legs, a gage glass communicating with one of said legs and having a cross sectional area less than that of the other pressure leg, a heavy liquid in the said legs, and a lighter liquid imposed on the heavy liquid in the leg with which the gage glass communicates and extending up into the gage tube, the walls of the gage being provided with supply passages leading through the wall thereof at different levels for supplying the heavy and light liquids and having removable closure means.

HERMAN BACHARACH.